United States Patent [19]

Yakuwa et al.

[11] Patent Number: 4,831,536

[45] Date of Patent: May 16, 1989

[54] METHOD OF PROCESSING CONTROLLED VARIABLES IN ENGINE CONTROL SYSTEM

[75] Inventors: Masahiko Yakuwa, Saitama; Kikuo Tomozawa, Tokyo, both of Japan

[73] Assignee: Honda Giken Kogyo Kabushiki Kaisha, Tokyo, Japan

[21] Appl. No.: 941,755

[22] Filed: Dec. 15, 1986

[30] Foreign Application Priority Data

Dec. 20, 1985 [JP] Japan ............................... 60-287176

[51] Int. Cl.[4] ......................... G06F 15/20; G06F 9/46

[52] U.S. Cl. ......................... 364/431.03; 364/431.11; 123/417; 123/440; 73/116

[58] Field of Search ...................... 364/431.05, 431.07, 364/431.03, 431.61, 140, 141; 123/417, 440, 480, 425, 426, 368; 73/116

[56] References Cited

U.S. PATENT DOCUMENTS 3,969,614 7/1976 Moyer et al. .................. 364/431.06
4,282,573 8/1981 Imai et al. .......................... 123/417
4,348,728 9/1982 Sugusaka et al. ............. 364/431.05
4,355,360 10/1982 Asano et al. ........................ 123/417
4,482,962 11/1984 Amano et al. ...................... 123/417

*Primary Examiner*—Parshotam S. Lall
*Assistant Examiner*—Ellis B. Ramirez
*Attorney, Agent, or Firm*—Lyon & Lyon

[57] ABSTRACT

An engine control system includes a pulse generator for generating a synchronous pulse signal synchronously with the speed of rotation of an engine, a timer for generating a timer pulse signal of a constant period, and a microcomputer having an interrupt input terminal for receiving the pulse signals as interrupt signals and operable to start processing operations in response to the interrupt signals, so that a number of controlled objects of the engine can be controlled on the basis of data indicative of operating conditions of the engine. Data is processed in response to an interrupt caused by the synchronous pulse signal to control a first-group controlled object of the number of controlled objects and setting a flag to request processing of data items related to the first-group controlled object. Data is then processed in response to an interrupt caused by the timer pulse signal to control a second-group controlled object of the number of controlled objects and setting a flag to request processing of a data item related to the second-group controlled object. In the absence of the interrupts, a plurality of predetermined data items and the data items requested to be processed by the flags are processed.

10 Claims, 2 Drawing Sheets

METHOD OF PROCESSING CONTROLLED VARIABLES IN ENGINE CONTROL SYSTEM

BACKGROUND OF THE INVENTION

1. Field of the Invention

The present invention relates to a method of processing controlled variables in an engine control system, and more particularly to a method of processing controlled variables in an electronic engine control system for controlling an engine based on various data items produced during operation of the engine.

2. Description of the Prior Art

There are known various electronic engine control systems for controlling engine operation, employing a microcomputer for processing various controlled variables such as the amount of fuel to be injected, ignition spark timing, and the amount of exhaust gas to be sent back through the engine in EGR (Exhaust Gas Recirculation) based on various data items representative of engine operating conditions such as the amount of intake air, and the rotational speed of the engine, etc. For example, U.S. Pat. No. 3,969,614 issued to David F. Moyer et al on July 13, 1976 discloses an engine control system that is programmed for simultaneously processing various controlled variables on a real-time basis. Since many controlled variables must be processed at the same time in the disclosed engine control system, the microcomputer in the engine control system is required to have a processing capacity large enough to execute many arithmetic operations for meeting the above requirement. Therefore, the design of the circuit arrangement of the engine control system is complex, and the engine control system is highly costly to manufacture.

U.S. Pat. No. 4,163,282 issued to Yamada et al on July 31, 1979 discloses a method of processing controlled variables in an engine control system in order to solve the problems of the above conventional engine control system. In this prior art, control variables , requiring high-accuracy control, such as the amount of fuel to be injected and ignition spark timing, and the amount of exhaust gas to be sent back in EGR, are given respective priorities dependent on the frequency at which they are processed, and are processed according to the given priority sequence. More specifically, the amount of fuel to be injected and ignition spark timing, which are given the first priority, are processed when an interrupt is caused by a crank pulse that is generated by a crank angle sensor each time the crankshaft rotates through a predetermined angle. After the first priority task is finished, the amount of exhaust gas in EGR, or the second priority task, is processed by an interrupt that occurs in response to a timer pulse produced from a timer circuit. When an interrupt is requested by a crank pulse while the amount of exhaust gas in EGR is being processed, control is transferred from the second priority task to the first priority task so that the amount of fuel to be injected and ignition spark timing are processed. After completion of the first priority task, control returns to the processing of the amount of exhaust gas in EGR.

The above processing method is however disadvantageous for the following reason: In a higher engine rotation range, crank pulses are produced at smaller intervals. Therefore, the time required for processing the amount of fuel to be injected, for example, upon a crank- pulse-initiated interrupt request occupies a large proportion in the entire operation time of the engine control system. The processing operation for the amount of fuel to be injected thus tends to be limited.

SUMMARY OF THE INVENTION

In view of the aforesaid drawback of the conventional processing methods in engine control systems, it is an object of the present invention to provide a method of processing various controlled variables in an engine control system, such as the amount of fuel to be injected, ignition spark timing, and the amount of exhaust gas to be sent back in EGR upon interrupt requests, the method processing those data items which do not change greatly in another routine to reduce the proportion of the processing of controlled variables such as the amount of fuel to be injected and ignition spark timing in a higher engine rotation range, for thereby increasing the processing capability of a microcomputer in the engine control system.

According to the present invention, there is provided a method of processing controlled variables in an engine control system having pulse generator means for generating a synchronous pulse signal synchronosly with the speed of rotation of an engine, timer means for generating a timer pulse signal of a constant period, and a microcomputer having an interrupt input terminal for receiving the pulse signals as interrupt signals and operable to start processing operations in response to the interrupt signals, so that a number of controlled objects of the engine can be controlled on the basis of data indicative of operating conditions of the engine, said method comprising the steps of:

(a) processing data in response to an interrupt caused by said synchronous pulse signal to control a first-group controlled object of said number of controlled objects and setting a flag to request processing of data items related to said first-group controlled object;

(b) processing data in response to an interrupt caused by said timer pulse signal to control a second-group controlled object of said number of controlled objects and setting a flag to request processing of a data item related to said second-group controlled object; and (c) processing a plurality of predetermined data items and said data items requested to be processed by said flags in the absence of said interrupts.

A predetermined priority sequence is given to the processing of data items in the step (c).

Processing operations of lower priorities are skipped in said step (c) when the interrupt is requested at a higher frequency in said step (a).

The data items have a low rate of change per a unit time.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
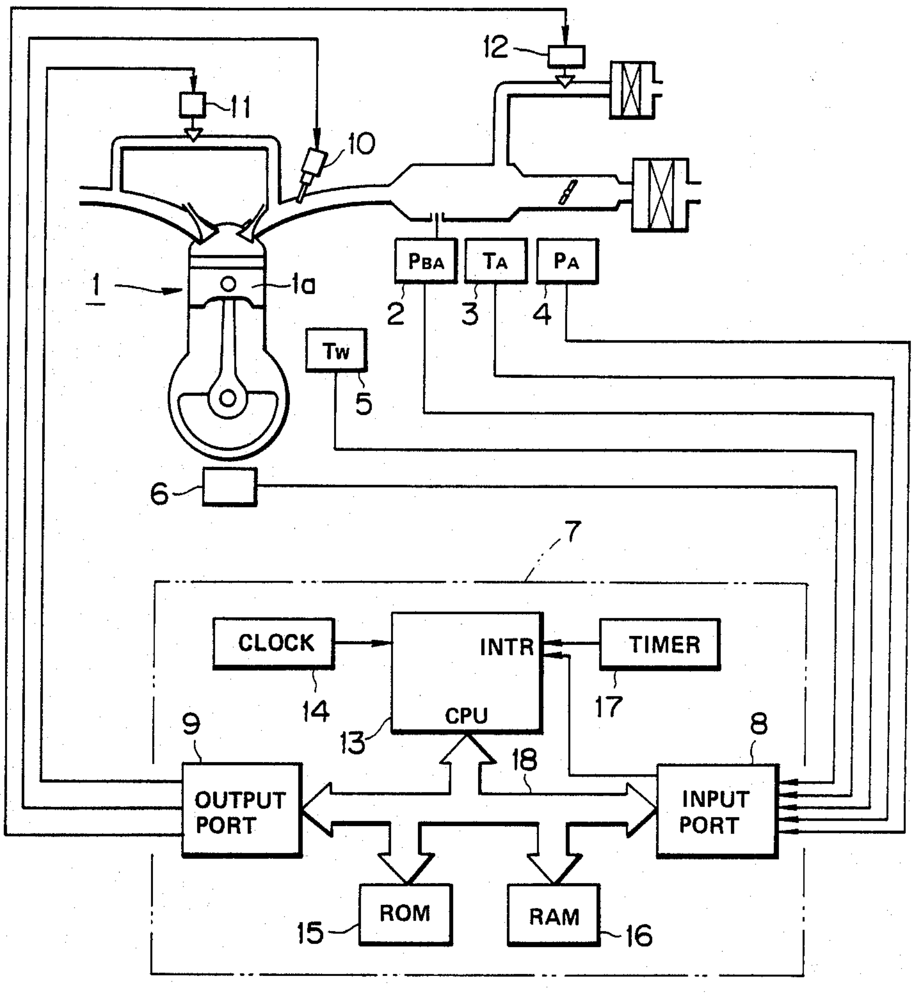
FIG. 1 is a schematic block diagram of an engine control system for carrying out a processing method according to the present invention.

FIG. 1 schematically shows an engine control system for carrying out a method of the present invention.

Various sensors are associated with an engine 1 having a piston 1*a*. These sensors include an intake-air pressure sensor 2 for detecting the pressure $P_{BA}$ of intake air drawn into the engine, an intake-air temperature sensor 3 for detecting the temperature $T_A$ of the intake air, an atmospheric-pressure sensor 4 for detecting the atmospheric pressure $P_A$, a coolant temperature sensor 5 for detecting the temperature $T_W$ of the coolant for the engine 1, and a crank angle sensor 6 for producing a crank pulse each time the piston la reaches its top dead center (TDC). These sensors 2, 3, 4, 5, 6 are connected to an input port 8 of a microcomputer 7 indicated as being enclosed by the two-dot-dash line. The microcomputer 7 has an output port 9 connected, for example, to a fuel injector 10 which is a first-group controlled object, and an EGR control valve 11 and an idling-speed control valve 12 which are a second-group controlled object. The microcomputer 7 also includes a central processing unit (CPU) 13, a clock generator 14, a read-only memory (ROM) 15, a random-access memory (RAM) 16, and a timer 17 connected to an interrupt terminal (INTR) of the CPU 13. The CPU 13, the ROM 15, the RAM 16, the input port 8, and the output port 9 are interconnected by a bus line 18.

The first-group controlled object, or the fuel injector 10, and the second-group controlled object, or the EGR control valve 11 and the idling-speed control valve 12, are controlled by the microcomputer 7 based on processing of respective controlled variables initiated by interrupts.

More specifically, for controlling the first-group controlled object, processing of its controlled variable (hereinafter referred to as "synchronous processing") is initiated by an interrupt caused by a crank pulse produced by the crank angle sensor 6 each time the piston 1*a* reaches its TDC. For controlling the second-group controlled object, processing of its controlled variables (hereinafter referred to as "timer processing") is initiated by an interrupt caused by a timer pulse produced by the timer 17 in each preset period.

According to the illustrated embodiment, furthermore, the processing sequences for the first- and second-group controlled objects are given higher and lower priorities, respectively, dependent on the processing frequency through hardware implementation. More specifically, when an interrupt is requested for the synchronous processing to control the first-group controlled object while the timer processing is being carried out for controlling the second-group controlled object, control is transferred from the timer processing to the synchronous processing since the synchronous processing has the higher priority. The timer processing for the second-group controlled object is resumed after the synchronous processing for the first-group controlled object has ended.

The engine control system is programmed by a program stored in the ROM 15 to execute, in addition to the synchronous processing and the timer processing, various other processing sequences (hereinafter referred to "background processing" or "BG processing") required to control the engine 1 when the above interrupts are not present.

Figure 2:
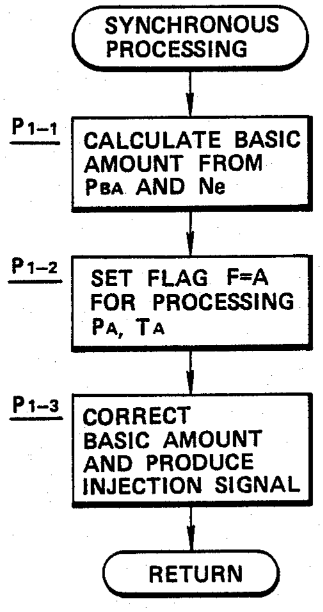
FIG. 2 is a flowchart of an operation sequence of synchronous processing executed by the engine control System.

FIG. 2 illustrates a routine for the synchronous processing. The routine is started upon an interrupt requested by a crank pulse from the crank angle sensor 6. For determining the amount of fuel to be injected by the fuel injector 10, for example, the engine rotation speed Ne is calculated on the basis of crank pulses, and the basic amount of fuel to be injected, within the above amount of fuel to be injected, is calculated from the engine rotation speed Ne and the detected value $P_{BA}$ of the intake vacuum, in a step $P_{1-1}$. In a next step $P_{1-2}$, those detected data items which do not substantially change in a unit time, such as the intake-air temperature $T_A$ and the atmospheric pressure $P_A$, are not processed in this routine, and a flag F=A is set for requesting the processing of those data items. Then, the basic amount of fuel to be injected, which has been calculated in the step $P_{1-1}$, is corrected by a corrective value that has previously been calculated in a BG routine (described later) and stored in the RAM 16, and a fuel injection signal is applied to the fuel injector 10, in a step $P_{1-3}$.

Figure 3:
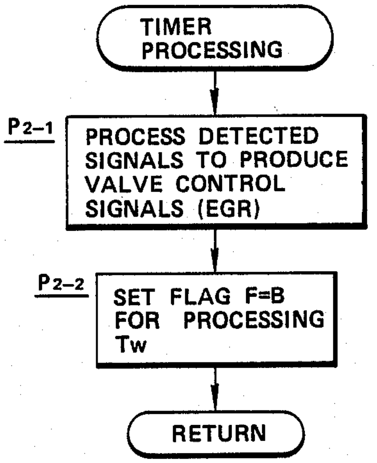
FIG. 3 is a flowchart of an operation sequence of timer processing executed by the engine control system.

The timer routine, illustrated in FIG. 3, is started by an interrupt caused in a predetermined period by a timer pulse from the timer 17. In a step $P_{2-1}$, the detected signals are processed for the control of the EGR control valve 11 and the idling-speed control valve 12, and control signals are applied to these valves 11, 12. A data item which does not vary to a substantial extent, such as the coolant temperature $T_W$, is not processed. A flag F=B for requesting the processing of such a data item is set in a step $P_{2-2}$.

Figure 4:
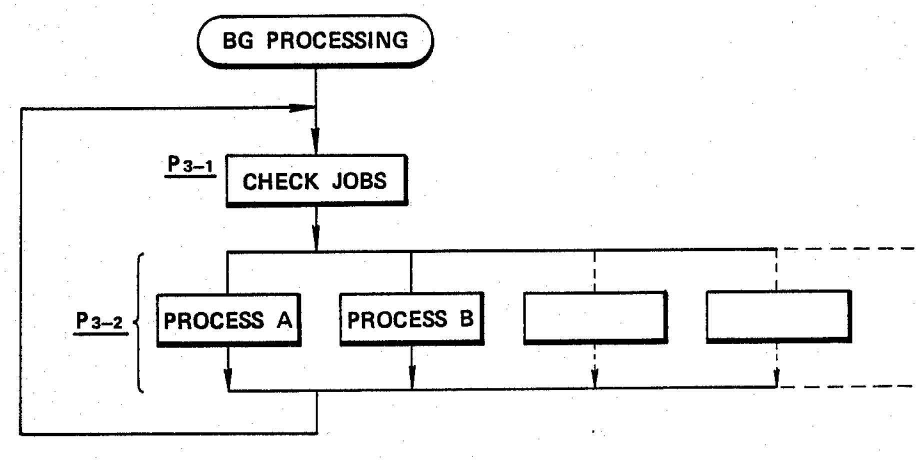
FIG. 4 is a flowchart of an operation sequence of BG processing executed by the engine control system.

FIG. 4 shows the BG routine which is repeated in the absence of interrupt requests for the synchronous processing and the timer processing. A step $P_{3-1}$ first checks jobs to be done, i.e., checks if the flags A, B, . . . are set or not. There is a priority sequence that has been given to the flags A, B, . . . , and the processing operations indicated by the flags A, B, . . . are carried out according to the priority sequence in a step $P_{3-2}$. For example, where the flag A has a higher priority over the flag B, the processing operation represented by the flag A is effected at first, and then that indicated by the flag B is effected next. After the processing of step $P_{3-2}$, the respective flag is reset. If these flags A, B, . . . are not set, then a processing sequence which has previously been defined in the BG processing is executed.

As described above, those data items which do not change to a substantial extent are not processed in the synchronous and timer processing routines, but processed in the BG routine. Therefore, the times required by the synchronous processing and the timer processing are shortened. As a consequence, the proportion occupied by the synchronous processing in a higher engine rotation range can be reduced, and a sufficient time is provided for these processing operations, so that the synchronous processing itself will not be limited. More specifically, as the engine rotation speed goes higher, the synchronous processing is initiated more frequently, and the BG processing time becomes shorter. When this happens, processing operations of lower priorities are skipped or removed from the BG processing, resulting in a higher processing capability of the microcomputer.

With the arrangement of the present invention, as described above, since the processing time for the amount of fuel to be injected which requires frequent processing can be shortened, the proportion of that processing time remains short even in a higher engine rotation range. As a result, the processing capability of the microcomputer can be increased.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A method processing controlled variables in an engine control system having pulse generator means for generating a synchronous pulse signal synchronously with the speed of rotation of an engine, timer means for generating a timer pulse signal of a constant period, and a microcomputer having an interrupt input terminal for receiving the pulse signals as interrupt signals and operable to start processing operations in response to the interrupt signals, so that a number of controlled objects of the engine can be controlled on the basis of data indicative of operating conditions of the engine, said method comprising the steps of:

(a) processing data in response to an interrupt caused by said synchronous pulse signal to control a first-group controlled object of said number of controlled objects and setting a flag to request processing of at least one data item related to said first-group controlled object;

(b) processing data in response to an interrupt caused by said timer pulse signal to control a second-group controlled object of said number of controlled objects and setting a flag to request processing of at least one data item related to said second-group controlled object; and (c) separately processing a plurality of predetermined data items and said at least one data items requested to be processes by said flags in the absence of said interrupts as processing time of said microcomputer becomes available separate from the data processing of steps (a) and (b), said at least one data items being of the type that have a low rate of change per unit of time as compared to the data processes in steps (a) and (b).

2. A method according to claim 1, wherein said pulse generator means comprises a crank angle sensor for producing a crank pulse each time the engine rotates through a prescribed crank angle.

3. A method according to claim I, wherein a predetermined priority sequence is given to the processing of data items in the step (c).

4. A method according to claim 3, wherein processing operations of lower priorities are skipped in said step (c) when the interrupt is requested at a higher frequency in said step (a).

5. A method according to claim 1, wherein said first-group controlled object includes a fuel injector.

6. A method according to claim 5, wherein said at least one data item related to said first-group controlled object represent an intake-air temperature and an atmospheric pressure.

7. A method according to claim 6, wherein said fuel injector is controlled on data corrected by a value processed prior to the current said at least one data item.

8. A method according to claim 1, wherein said second-group controlled object includes an EGR control valve and an idling-speed control valve.

9. A method according to claim 8, wherein said at least one data item related to said second-group controlled object represents a coolant temperature.

10. A method according to claim 9, wherein said EGR control valve and said idling-speed control valve are controlled on data corrected by a value processed prior to the current said at least one data item.

* * * * *